(12) United States Patent
Berneski, Jr. et al.

(10) Patent No.: US 6,675,634 B2
(45) Date of Patent: Jan. 13, 2004

(54) BRANCH PIPE/TANK NOZZLE TEST PLUG AND METHOD OF USE

(75) Inventors: James P. Berneski, Jr., Warrington, PA (US); Henry Brandenberger, Hatfield, PA (US)

(73) Assignee: EST Group, Inc., Harleysville, PA (US)

(*) Notice: Subject to any disclaimer, the term of this patent is extended or adjusted under 35 U.S.C. 154(b) by 0 days.

(21) Appl. No.: 10/094,057

(22) Filed: Mar. 8, 2002

(65) Prior Publication Data

US 2003/0167827 A1 Sep. 11, 2003

(51) Int. Cl.⁷ ................................................ G01M 3/00
(52) U.S. Cl. ........................ 73/49.8; 73/46; 73/49.2; 73/49.8; 73/40.5 R; 138/90; 138/89
(58) Field of Search .................... 73/49.8, 46, 49.2, 73/40.5 R; 138/90, 89

(56) References Cited

U.S. PATENT DOCUMENTS

| | | | |
|---|---|---|---|
| 4,381,800 A | * 5/1983 | Leslie | 73/49.5 |
| 4,890,483 A | 1/1990 | Vetter | 73/40.5 R |
| 5,024,079 A | 6/1991 | Dufort | 73/49.8 |
| 5,331,841 A | 7/1994 | Beaver et al. | 73/49.2 |
| 5,456,290 A | * 10/1995 | Haberman et al. | 138/89 |
| 5,760,296 A | 6/1998 | Wilson | 73/49.7 |
| 5,797,431 A | 8/1998 | Adams | 138/89 |
| 5,996,401 A | 12/1999 | Lewis | 73/49.2 |
| 6,131,441 A | 10/2000 | Berube et al. | 73/49.8 |

* cited by examiner

*Primary Examiner*—Hezron Williams
*Assistant Examiner*—André K. Jackson
(74) *Attorney, Agent, or Firm*—Howson and Howson

(57) ABSTRACT

A test plug and method for isolating and testing a connection, such as a welded connection, which interconnects a wall of tank, vessel, or pipe to a branch pipe or nozzle. The test plug isolates the connection from the remainder of the tank, vessel or piping system and enables pressure/leak testing of the connection without requiring pressurization of the entire tank or vessel or a large section of the piping system. Further, the test plug can be utilized during welding operations to isolate harmful materials, vapors or fumes existing within tanks, vessels or piping systems from the weld location and to permit the flow of an inert gas to safely flush any potentially harmful vapors or the like away from the welding area.

28 Claims, 9 Drawing Sheets

BRANCH PIPE/TANK NOZZLE TEST PLUG AND METHOD OF USE

FIELD OF THE INVENTION

The present invention relates to a test plug and method for isolating and pressure testing a connection between a tank, vessel, or pipe and a nozzle or branch pipe extending externally therefrom.

BACKGROUND OF THE INVENTION

Site specifications, applicable design codes, and/or applicable testing codes typically require testing of new or modified piping, tank, and/or vessel systems including the testing of connections made between all piping components. The testing can be, for instance, a positive pressure test or a vacuum test and must verify the structural integrity of the system and determine if any leaks exist within the system, particularly at pipe connection locations. U.S. Pat. No. 5,797,431 issued to Adams, which is assigned to EST Group Inc., the assignee of present application, and U.S. Pat. No. 5,024,079 issued to Dufort disclose examples of known test plugs.

The Adams patent discloses a test plug which is used to seal a non-flanged end of a pipe. To this end, the test plug is inserted into the open end of a pipe and expanded to grip and form a fluid-tight seal with an inner peripheral surface of the pipe. Thus, the pipe can be pressure tested downstream of the inner diameter test plug while the test plug provides a fluid-tight seal and prevents the plug from being blown out of the pipe during high test pressure conditions.

The Dufort patent discloses a test plug for a flanged pipe in which an expandable distal end of the plug is inserted into the pipe and an opposite flanged end of the plug is connected to a flanged-end of a pipe to create a fluid-tight seal. For instance, see FIGS. 4–6 of the Dufort patent. When the distal end is expanded, it also creates a fluid-tight seal so that the weld between the pipe and the flange of the pipe can be pressure tested. To this end, fluid is injected into the flanged end of the plug and only the flanged end of the pipe is tested so that the remaining piping system is not required to be placed under pressure during the pressure testing of the flange connection.

While the above referenced test plugs function satisfactorily for their intended purposes, they cannot be utilized to isolate and test a connection, such as a welded connection, between a tank, vessel, or pipe and a branch pipe or nozzle, without having to pressurize the entire tank or vessel or a large portion of the piping system. For example, FIGS. 1A–1C of the present application illustrates a section 10 of a hollow, cylindrical, relatively large diameter pipe, tank or vessel and an externally-extending, relatively smaller diameter, flanged branch connection 12. The flanged branch connection 12 can be, for instance, a relatively smaller diameter branch pipe or tank nozzle. An interior weld location 14 or an exterior weld location 16 can be utilized, for example, to join the flanged branch connection 12 to section 10. The relative diameters of section 10 and branch connection 12 can vary widely and are not required to have a circular transverse cross-section, as illustrated.

In the construction of such systems as shown in FIGS. 1A–1C, inlets, outlets, welded fittings, nozzle connections and branch line connections 12 are made transversely through the periphery of the relatively larger diameter pipe, vessel or tank section 10. As best shown in FIGS. 1B and 1C, an inner end 18 of the branch connection 12 typically extends entirely within the larger diameter pipe, tank or vessel section 10. The opposite end 20 of the branch connection 12 can be connected by a weld 22 to a flanged end 24 as illustrated in FIGS. 1A–1C, or can be without a flange end as best illustrated in FIG. 8 of the present application as will be discussed in greater detail. Typically, if such systems are made from steel components, the connections are made utilizing welding techniques; however, other known techniques can also be utilized to join the various components. As stated above, typically the various components are cylindrical, however, the various joined components can have, for instance, rectangular, square, spherical, or oval transverse cross sections.

Conventionally, pressure testing of the internal or external welds 14 or 16 of the branch connection 12 to section 10 is accomplished by pressurizing the entire piping system, tank or vessel, or a large part of the piping system. Thus, such testing is time consuming, expensive, and can create potential hazards. In addition, welding operations utilized to join a branch connection 12 to an existing section 10 of a piping system, tank or vessel may be performed in the presence of combustible, dangerous, and/or otherwise harmful materials or vapors which are present within the existing piping system, tank or vessel. Thus, the welding operation as well as the testing operation may be subject to potential hazards.

Various patents disclose pipe, tank, or vessel testing or repair apparatus and methods. For example, U.S. Pat. No. 5,760,296 issued to Wilson discloses the use of an inflatable bladder to form a fluid-tight seal with an inner wall of a vessel adjacent a nozzle. The bladder is inserted through an opening in the nozzle and is positioned within the vessel before being inflated. The disclosed pressure testing device is designed to isolate the vessel from the nozzle so that the vessel can be pressure tested, not the vessel-to-nozzle weld connection.

U.S. Pat. No. 5,996,401 issued to Lewis discloses a leak test adaptor system that attaches to a vessel via a test port and permits the vessel to be filled with a tracer gas or fluid so that the vessel and the test port can be simultaneously tested for leaks. A plug is located within the test port and is manipulated between sealing and non-sealing positions by a rod which extends externally of the vessel. Thus, an adaptor can be connected to the test port to open the plug, fill the vessel with a tracer gas, and close the plug to test for leaks.

U.S. Pat. No. 5,331,841 issued to Beaver et al. discloses a process and apparatus for repairing a damaged surface of a nozzle extending from a vessel. To this end, a new inner nozzle is installed within the damaged nozzle to line the damaged nozzle, and a seal is formed at both ends of the new inner nozzle to create a leak-free repaired nozzle. As illustrated in FIG. 8 of the Beaver patent, a gasket can be utilized to form a seal between the inner wall of the tank and the end of the new nozzle inserted within the tank.

U.S. Pat. No. 6,131,441 issued to Berube et al. and U.S. Pat. No. 4,890,843 issued to Vetter disclose other devices for isolating and testing pipe segments.

Although the test plugs and methods of isolating and testing pipe sections and/or tanks and vessels disclosed in the above referenced patents may function satisfactorily for their intended purposes, there remains a need for a test plug device and method which enables ready isolation and testing of a connection, such as a welded connection, between a tank, vessel, or pipe and a branch pipe or nozzle. Preferably, the test plug should isolate the connection from the tank, vessel or remaining piping system to enable testing of the connection without requiring the entire tank or vessel or a large section of the piping system to be pressurized. In addition, preferably the test plug should isolate a welding operation from harmful materials or vapors existing within the tank, vessel or piping system and should permit an inert gas to be utilized to flush any potentially harmful vapors or the like away from the area to be welded. Further, the test plug and method should permit reliable, ready and efficient installation and use requiring only a minimum of skill and labor, and the test plug should be inexpensive to manufacture.

OBJECTS OF THE INVENTION

With the foregoing in mind, a primary object of the present invention is to provide a test plug which enables ready isolation and testing of a connection, such as a welded connection, between a tank, vessel, or pipe and a branch pipe or nozzle.

Another object of the present invention is to provide a test plug which isolates the connection from the tank, vessel or remaining piping system to enable pressure/leak testing of the connection without requiring the entire tank or vessel or a large section of the piping system to be subject to the test pressurization.

A further object of the present invention is to provide a test plug which isolates welding operations utilized to connect branch connections to tanks, vessels or pipes from harmful materials or vapors existing within the tank, vessel or piping systems and which permits the flow of an inert gas to flush any potentially harmful vapors or the like away from the area to be welded.

A still further object of the present invention is to provide a method which is used to isolate and test a branch connection and which permits reliable, ready and efficient installation requiring only a minimum of skill and labor.

SUMMARY OF THE INVENTION

More specifically, the present invention is a test plug for isolating and testing the integrity of a connection, such as a welded connection, between a wall of a vessel, such as a tank or pipe, and a relatively smaller branch pipe, such as a nozzle, which extends transversely therefrom. The branch pipe typically has an inner end extending within the vessel and an open free end extending externally of the vessel. The test plug includes an inner subassembly that encloses the inner end of the branch pipe and forms a fluid-tight seal with an inner surface of the wall of the vessel adjacent and surrounding the connection when the test plug is in an installed condition. The test plug also includes a second subassembly for forming a fluid-tight seal with the opposite free end of the branch pipe. When installed, the inner and second subassemblies interact to form a fluid-tight chamber that isolates the connection from a remainder of the vessel. This enables the chamber to isolate the connection from vapor and materials present within the vessel and to be utilized to perform high pressure integrity and leak tests of the connection.

The inner subassembly of the test plug has an end surface which mates with the inner surface of the wall of the vessel surrounding the connection when the test plug is installed. Preferably, the end surface of the inner subassembly is contoured to substantially correspond to a contour of the inner surface of the wall of the vessel to ensure the formation of a proper seal.

According to another aspect of the present invention, a method is provided for isolating and proving the integrity of a connection between a wall of a vessel and a relatively smaller branch pipe extending transversely therefrom. The method includes inserting at least a portion of a test plug through the branch pipe and enclosing an inner end of the branch pipe that extends within the vessel with an inner subassembly of the test plug. The inner subassembly extends around the inner end of the branch pipe to an inner surface of the wall of the vessel adjacent and surrounding the connection. The test plug forms a fluid-tight seal adjacent an open free end of the branch pipe which extends externally of the vessel, and upon tightening of the test plug, the inner subassembly of the test plug forms a fluid tight seal with the inner surface of the wall of the vessel adjacent and surrounding the connection. This results in the formation of a fluid-tight chamber that extends only within the branch pipe and around and closely spaced to the inner end of the branch pipe. The fluid-tight chamber is completely isolated from a remaining portion of the vessel and can be utilized to pressure test the connection.

BRIEF DESCRIPTION OF THE DRAWINGS

The foregoing and other objects, features and advantages of the present invention should become apparent from the following description when taken in conjunction with the accompanying drawings, in which.

DETAILED DESCRIPTION OF THE PREFERRED EMBODIMENTS

Figure 1A:
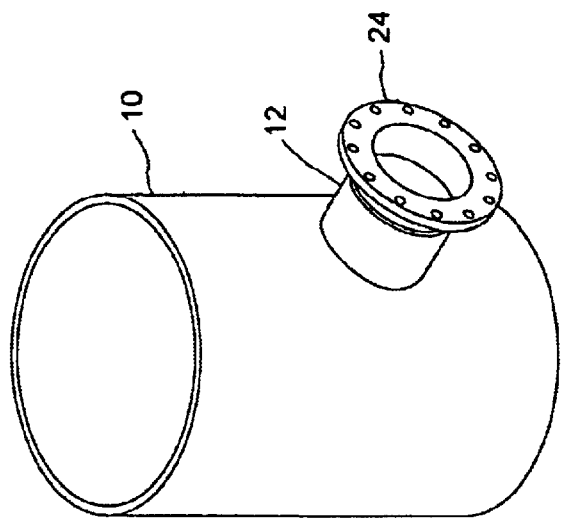
FIG. 1A is a perspective view of a section of a tank, vessel or pipe having a branch connection or tank nozzle extending externally therefrom.
Figure 1B:
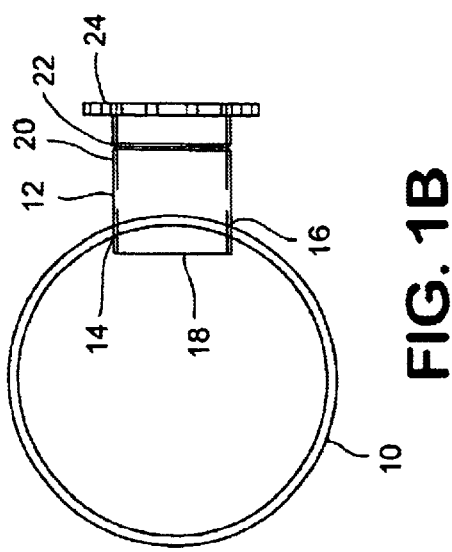
FIG. 1B is a top plan view of the tank, vessel, or pipe section illustrated in FIG. 1A.
Figure 1C:
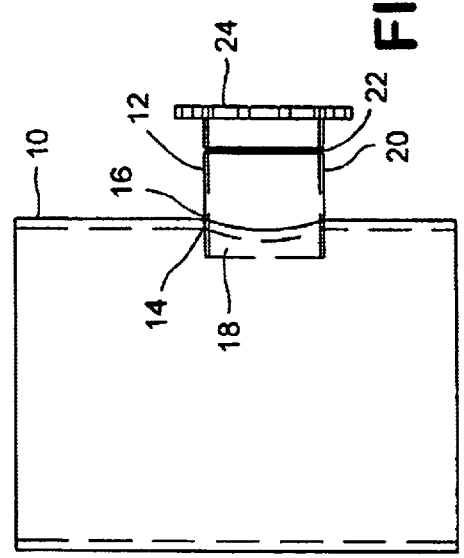
FIG. 1C is an elevational view of the tank, vessel, or pipe section illustrated in FIG. 1A.
Figure 2:
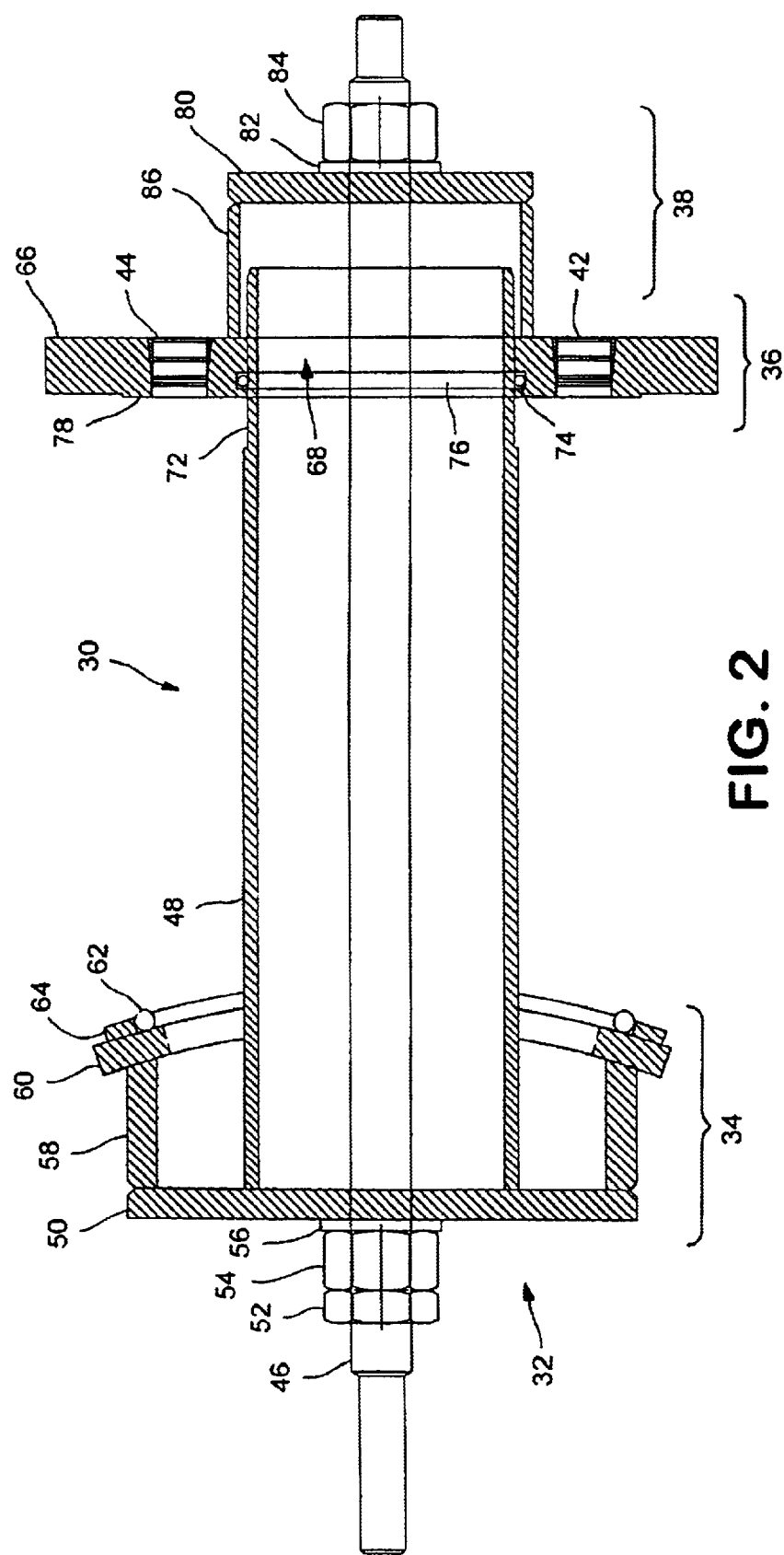
FIG. 2 is a cross-sectional view of an isolation and test plug according to the present invention.

Referring now to the drawings, FIGS. 2–7 illustrate a first embodiment of a test plug 30 according to the present invention. The test plug 30 is utilized to test a connection, such as a welded connection, which interconnects a tank, vessel, or pipe to a branch pipe or nozzle. To this end, the test plug 30 isolates the connection from the remainder of the tank, vessel or piping system to enable pressure/leak testing of the connection without requiring pressurization of the entire tank or vessel or a large section of the piping system. Further, the test plug 30 can be utilized during welding operations to isolate harmful materials, vapors or fumes existing within tanks, vessels or piping systems from the weld location and to permit the flow of an inert gas to safely flush any potentially harmful vapors or the like away from the welding area.

Figure 7:
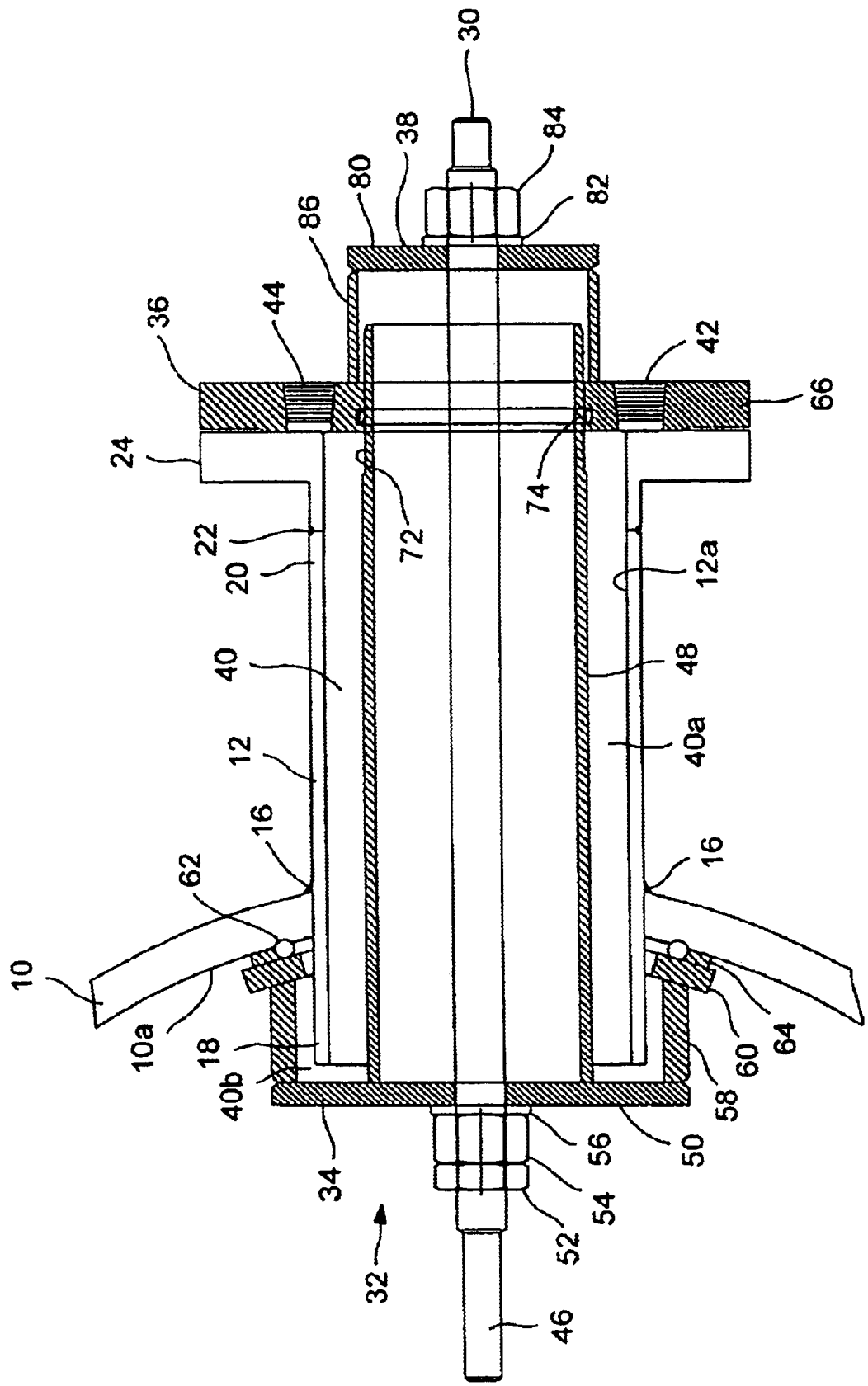
FIG. 7 is a cross-sectional view of the isolation and test plug as installed on a branch line extending transversely from a tank, vessel or pipe.

The functional features of test plug 30 are best illustrated in FIG. 7. When installed about a branch connection 12, an inner subassembly 32 of the test plug 30 extends a spaced distanced from and within the branch connection 12 and internally of section 10 of a tank, vessel or piping system. The inner subassembly 32 includes a reversely turned sealing means 34 which extends around the end 18 of the branch connection 12 and engages and forms a fluid-tight seal with an inner peripheral surface 10a of section 10 adjacent to the weld location, 14 or 16. Thus, the end 18 of the branch connection 12 is completely enclosed within the subassembly 32 and is isolated from the remainder of the tank, vessel, or piping system.

The test plug 30 also includes a flange subassembly 36 and an outer locking subassembly 38 which are located adjacent the opposite flanged end 24 of the branch connection 12. The flange subassembly 36 engages and forms a fluid-tight seal with the flanged end 24 of the branch connection 12 and interconnects to the inner subassembly 32 of the test plug 30. The outer locking subassembly 38 provides a means for compressing the test plug 30 to urge the inner subassembly 32 into tight sealing engagement with an inner peripheral surface 10a of the tank, vessel or pipe section 10 while the flange subassembly 36 forms a seal with the flanged end 24 of the branch connection 12.

When the test plug 30 is installed and tightened as described above, a relative small isolated test chamber 40 is formed adjacent selected surfaces of the branch connection 12 so that the weld connection, 14 or 16, can be tested. The chamber 40 includes a cylindrical portion 40a which extends between the inner peripheral surface 12a of the branch connection 12 and the inner subassembly 32 of the test plug 30 along the entire length of the branch connection 12. The chamber 40 also includes a portion 40b which wraps around the inner end 18 of the branch connection 12 and extends to the inner surface 10a of the tank, vessel or pipe section 10 encircling the weld locations 14 and 16.

A pressurizing fluid, such as a liquid or a gas, can be pumped into the chamber 40 via a fill port 42 in the flange subassembly 36 to pressurize the chamber 40 and to test the connection of the branch connection 12 to the tank, vessel, or pipe section 10 and to test the weld 22 between the branch connection 12 and the flanged end 24. A vent port 44 is also provided in the flange subassembly 36 so that, if a hydraulic fluid is injected into the chamber 40, the air within the chamber 40 can be vented.

During welding operations when an external weld connection 16 is to be formed between the branch connection 12 and tank, vessel, or pipe section 10, an inert gas can be caused to flow into chamber 40 via fill port 42 to remove any harmful vapors therein and to aid in the proper formation of a reliable fluid-tight weld.

A specific embodiment of the inner subassembly 32 of the test plug 30 is illustrated in FIGS. 2–7 and includes a partially threaded shaft 46 which extends parallel to and within a hollow cylindrical spacing tube 48. An inner washer 50 which forms a back wall of the test plug 30 is maintained in position on the shaft 46 between the spacing tube 48 and a jam nut 52, hex nut 54 and hardened washer 56. The inner washer 50 engages a compression tube 58 extending to a compression plate 60 which in turn engages a resilient face seal 62 and ring 64 extending concentrically about the seal 62. See FIG. 7. When the test plug 30 is installed and tightened, the resilient face seal 62 is compressed into engagement with the inner surface 10a of the tank, vessel or pipe section 10 to create a fluid-tight seal therewith. The ring 64 also engages the inner surface 10a and prevents the seal 62 from being blown outwardly out of sealing engagement with the inner surface 10a during high test pressure conditions. As an alternative to using ring 64, a groove (not shown) can be formed in the end wall of plate 60 thereby capturing the face seal 62 when in a compressed condition between the compression plate 60 and inner surface 10a of the tank.

Figure 3:
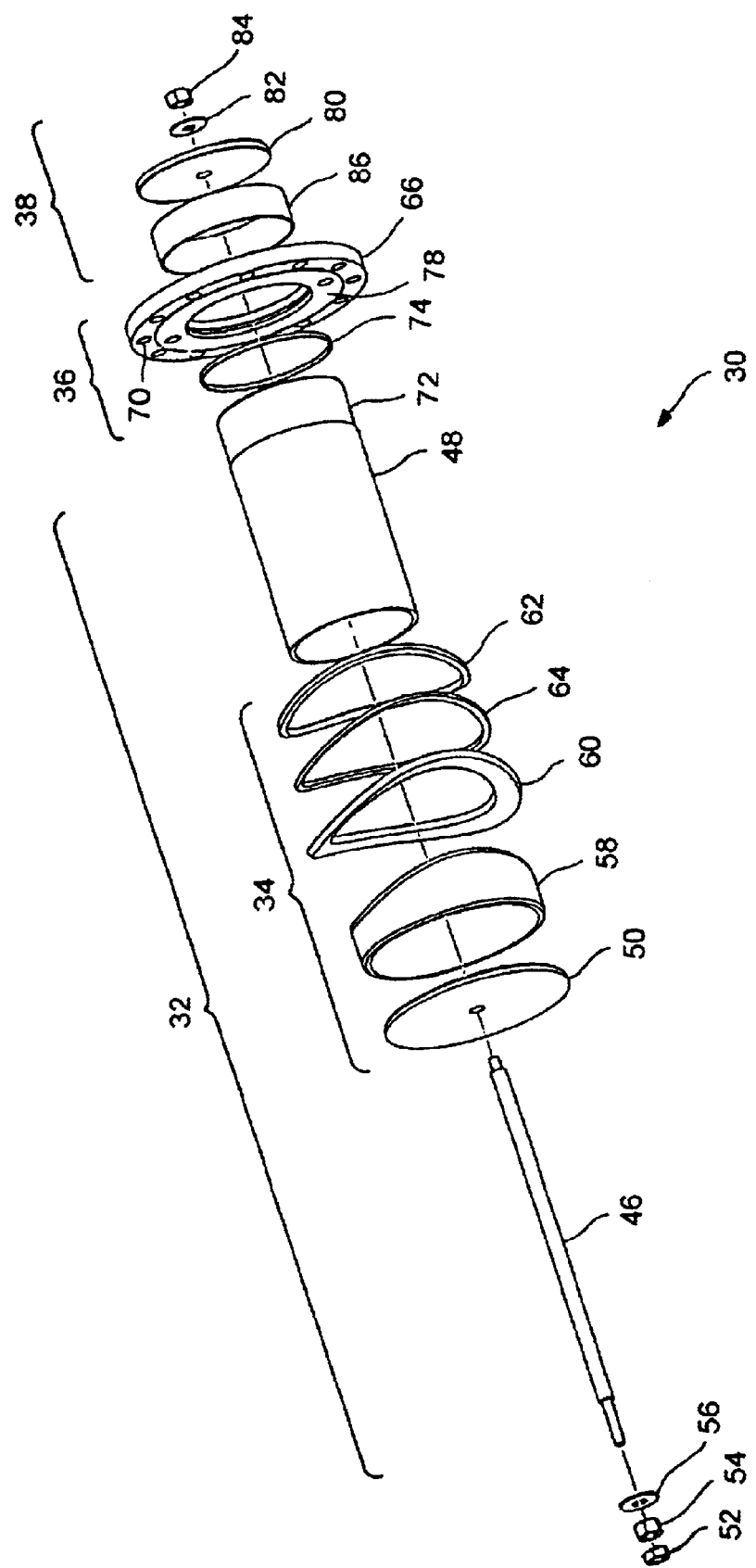
FIG. 3 is an exploded perspective view of the isolation and test plug according to the present invention.
Figure 4:
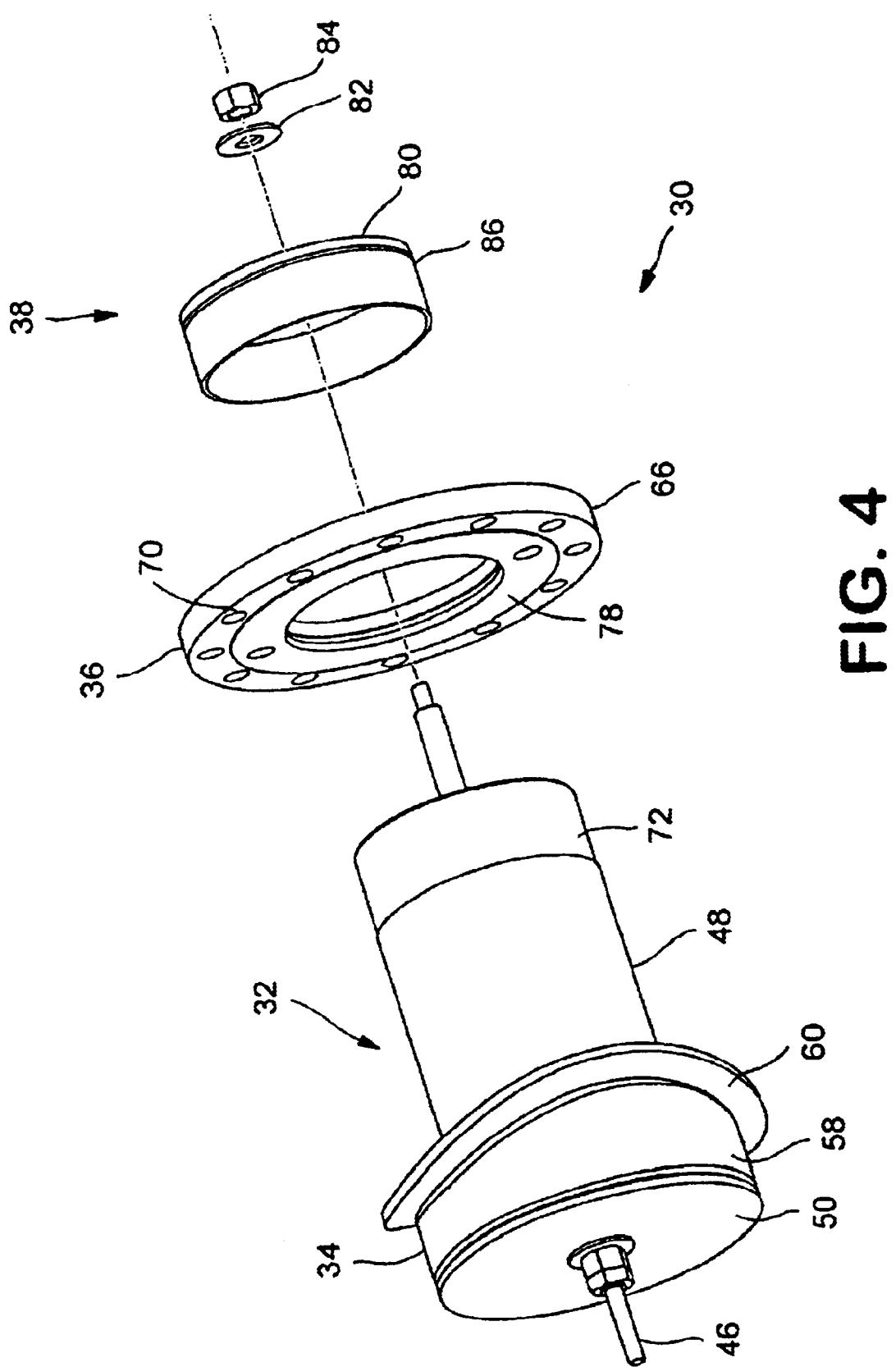
FIG. 4 is a partial exploded perspective view of the isolation and test plug according to the present invention.
Figure 5:
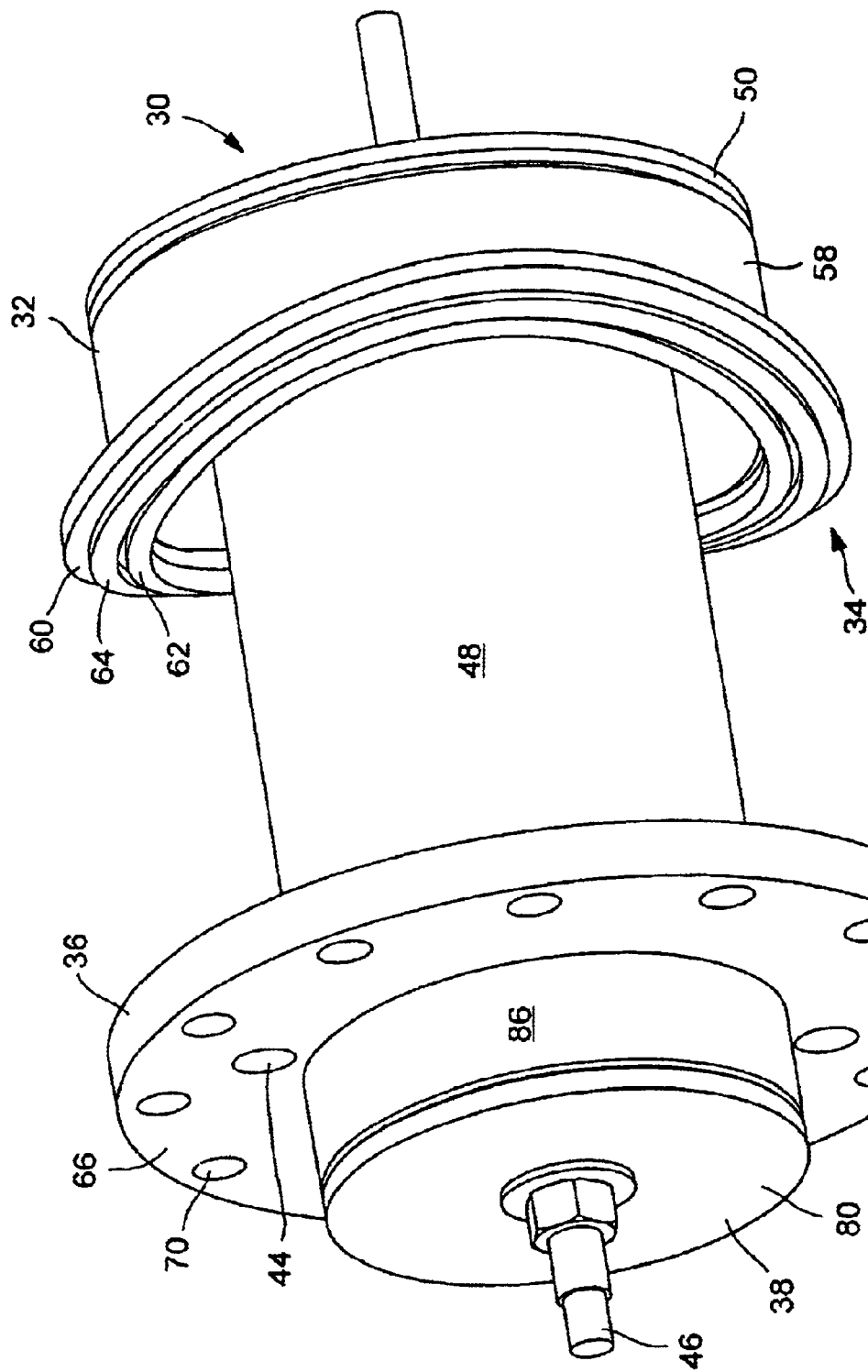
FIG. 5 is a perspective view of the isolation and test plug according to the present invention.
Figure 6:
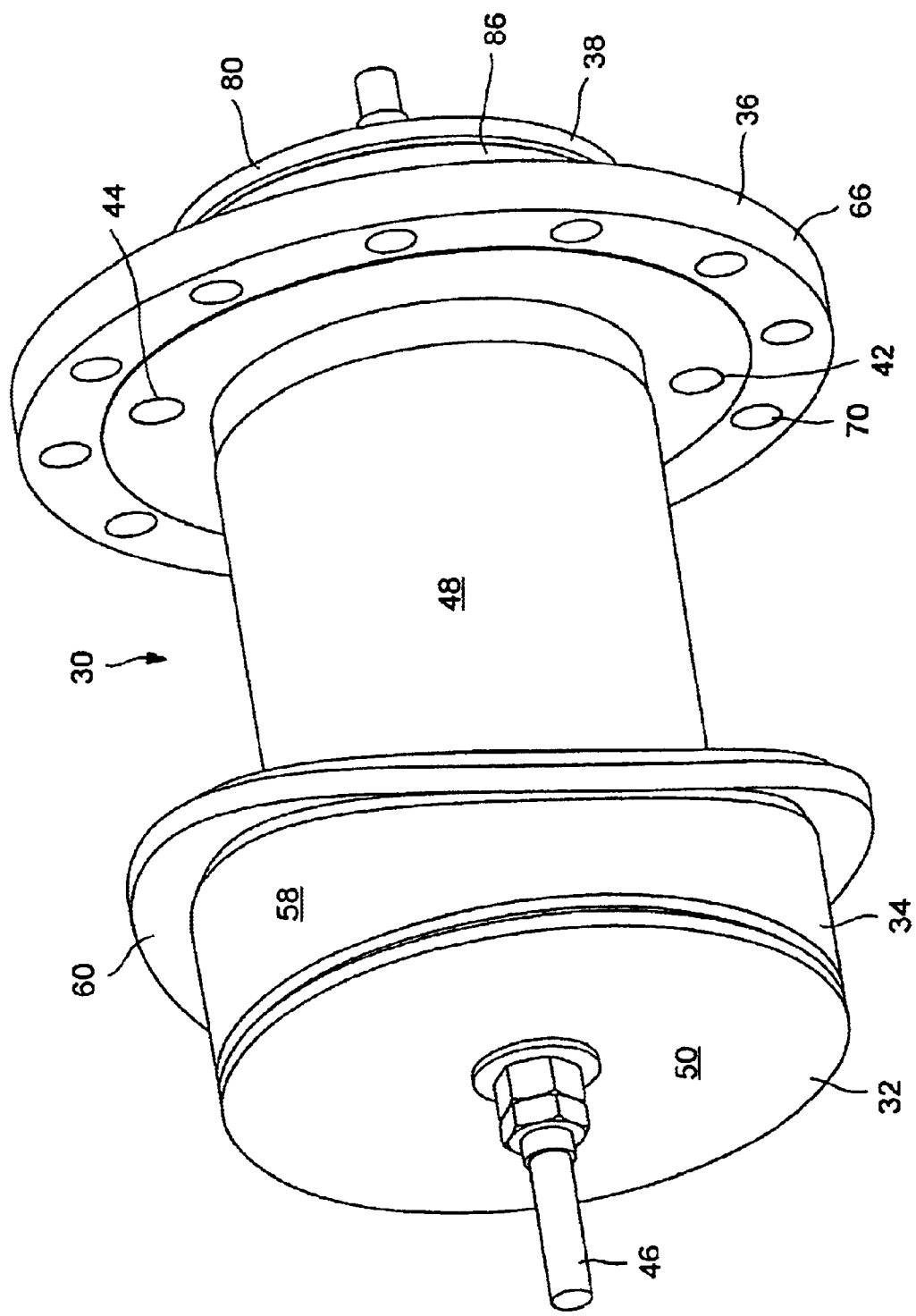
FIG. 6 is an opposite side perspective view of the isolation and test plug illustrated in FIG. 5.

As best illustrated in FIG. 3, the compression plate 60, face seal 62, ring 64, and one end of the compression tube 58 are provided with a non-planar contour which is similar in contour to the inner surface 10a of tank, vessel, or pipe section 10. For example, if the inner surface is formed at a given radius of curvature, the compression plate 60, face seal 62, ring 64, and one end of the compression tube 58 are formed at a corresponding matching radius of curvature to ensure that a fluid-tight seal is formed against the inner surface 10a. These contoured components can be manufactured in different shapes corresponding to the radius of curvature of a particular tank, vessel, or pipe section 10, or corresponding to a planar or other shaped surface, as desired.

The flange subassembly 36 includes an annular plate 66 with a central opening 68 and bolt-receiving apertures 70. The spacing tube 48 of the inner subassembly 32 includes an indented region 72 enabling the annular plate 66 to be inserted and ride on the spacing tube 48. The location of the annular plate 66 on the spacing tube 48 is axially adjustable to permit the test plug to be compressed during installation or expanded during disassembly and removal. A resilient O-ring 74 is located in a groove 76 extending on the annular plate 66 adjacent the central opening 68 to ensure that a fluid-tight engagement is formed between the annular plate 66 and spacing tube 48. In addition, an annular resilient gasket 78 is provided on the face of the annular plate 66 and forms a seal with flanged end 24 of the branch connection 12.

The outer locking subassembly 38 includes an outer washer 80 which forms a front wall of the test plug 30 and which is secured on the shaft 46 by a hardened washer 82 and hex nut 84. The outer washer 80 engages and urges an outer compression tube 86 into engagement with the annular plate 66. Thus, after the annular plate 66 is secured with bolts to the flanged end 24 of the branch connection 12, the hex nut 84 is turned to axially advance the spacing tube 48 relative to the annular plate 66 so that the test plug 32 is compressed and locked in sealing engagement about the branch connection 12. Thereafter, testing and/or welding can be commenced.

By way of example and not by way of limitation, all of the above components, except for the resilient seals, O-rings and gaskets, can be made of steel. In addition, the test plug 30 can be dimensioned to test branch connections 12 having an inner diameter of about ⅜ inch to about 2 or 3 feet or more. As stated previously, the contour of the sealing means 34 of the inner subassembly 32 can be provided as required to correspond to an inner surface of any tank, vessel or pipe.

Figure 8:
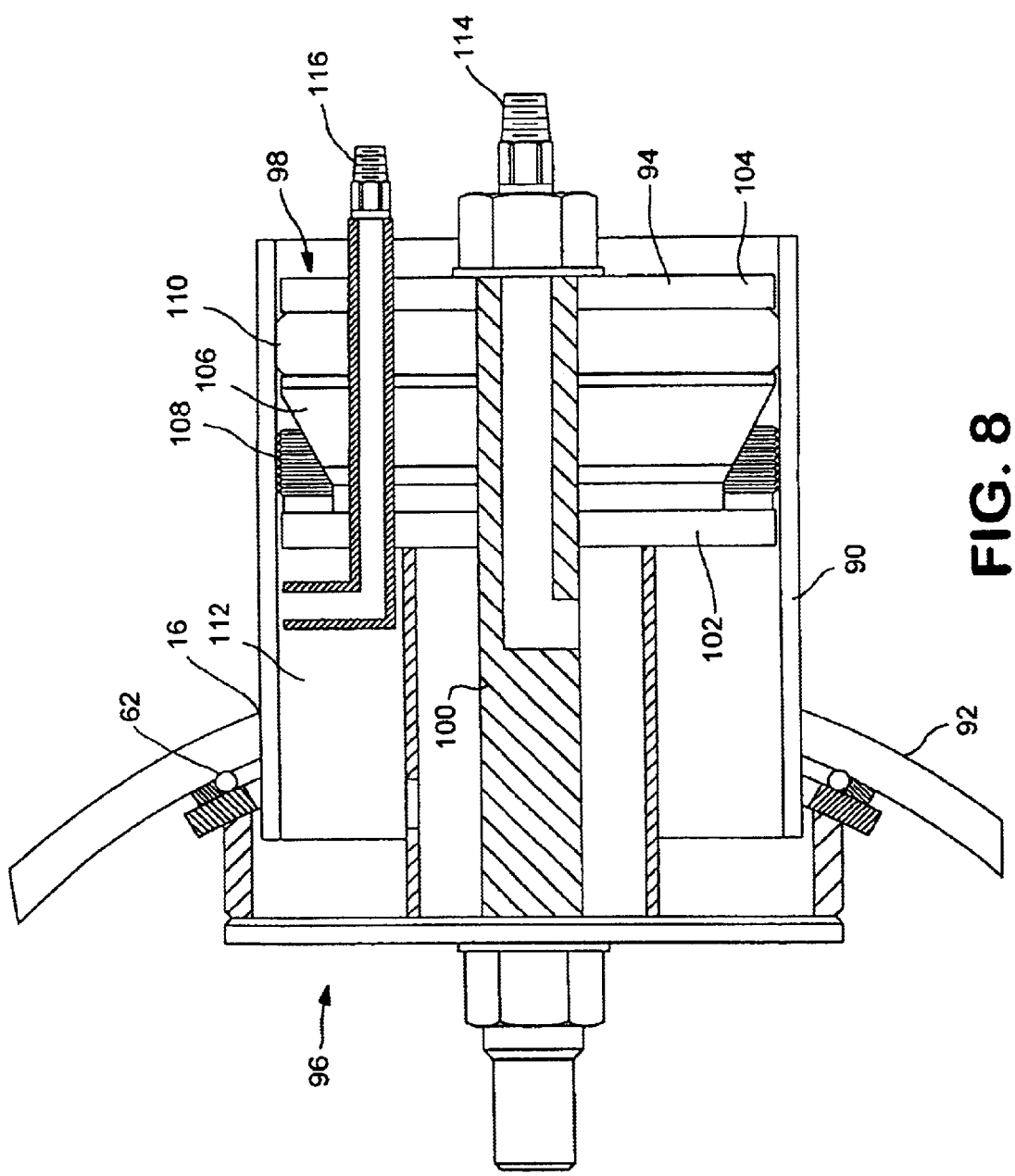
FIG. 8 is a cross-sectional view of an alternate embodiment of an isolation and test plug as installed on a branch line extending transversely from a tank, vessel or pipe.

A second embodiment of the present invention is illustrated in FIG. 8. To this end, a branch connection 90 is connected to and extends from a relatively larger diameter tank, vessel or pipe section 92. In this instance, the branch connection 90 does not have a flanged end to which a connection can be made. Therefore, a test plug 94 is provided which has a similar inner subassembly 96 as that described for test plug 30, but does not have a flanged subassembly or an outer locking subassembly. Rather, the test plug 94 has an inner diameter plug subassembly 98.

The inner diameter plug subassembly 98 is mounted on a shaft 100 of the inner subassembly 96 and includes distal and proximal annular plates 102 and 104. The distal plate 102 engages the open free end of the branch connection 90, and the proximal plate 104 forms a front wall of test plug 94. A frustoconical rigid member 106, a plurality of grippers 108 and a resilient annular seal 110 are sandwiched between plates 102 and 104.

In use, when the components of the test plug 94 are caused to be compressed on the shaft 100, the inner subassembly 96 forms a fluid-tight seal with the inner surface of the tank, vessel or pipe section 92, and the spacing between the distal and proximal plates, 102 and 104, is reduced. This causes the rigid grippers 108 to advance radially outward on the frustoconical surface of member 106 into locking engagement with the inner diameter of the branch connection 90. In addition, the seal 110 is compressed between the proximal plate 104 and the back planar side of the frustoconical member 106 and is urged radially outward into sealing engagement with the inner diameter of the branch connection 90. Thus, a test chamber 112 is created. A fill port 114 is provided within the shaft 100, and a separate vent port 116 is provided through the inner diameter plug subassembly 98.

Figure 9:
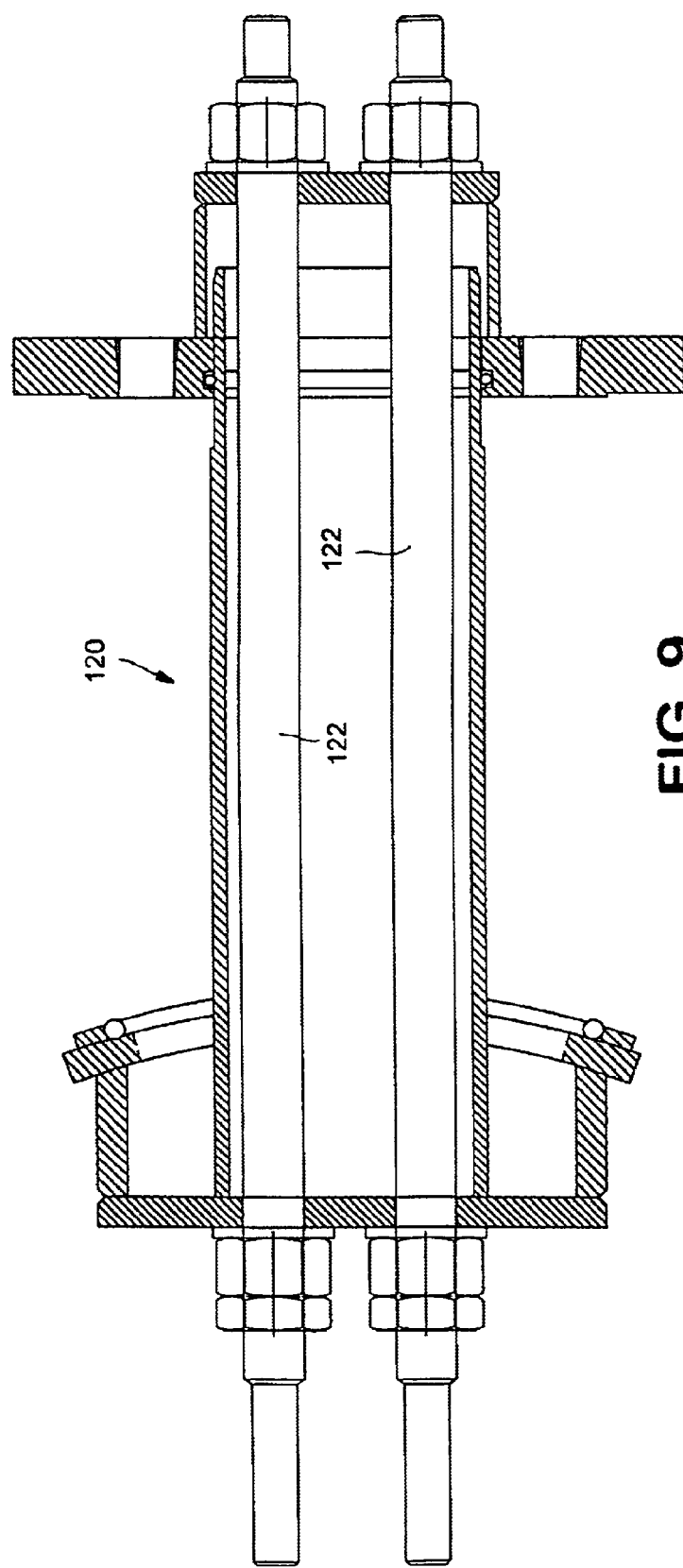
FIG. 9 is a cross-sectional view of a second alternate embodiment of an isolation and test plug according to the present invention.

A second alternate embodiment of the present invention is illustrated in FIG. 9. Test plug 120 is substantially identical to test plug 30 except that a plurality of shafts 122 are provided that extend parallel to each other and to the branch connection. The use of plural shafts enable larger sized test plugs to be made and enables the test plugs to be utilized under higher test pressures.

DETAILED DESCRIPTION OF THE PREFERRED METHOD

Another aspect of the present invention relates to a method of isolating and pressure testing a connection between a tank, vessel, or pipe and an externally extending nozzle or branch pipe. Test plugs 30 or 120 are utilized when the nozzle or branch pipe has a flanged end, and test plug 94 is utilized when the nozzle or branch pipe is without a flanged free end.

When the branch connection 12 has a flanged end 24, the annular plate 66 of the test plug 30 is connected to the flanged end 24 with a set of bolts. The annular gasket 78 ensures the formation of a fluid-tight seal between the annular plate 66 and the flanged end 24. Thereafter, the inner subassembly 32 of the test plug 30 is inserted through end 18 of the branch connection 12 within the tank, vessel, or pipe section 10. Thus, the sealing means 34 extends over end 18 of the branch connection and isolates it from the remainder of the tank, vessel or pipe section 10, and the spacing tube 48 extends through the branch connection 12 and central opening 68 of the installed annular plate 66. The O-ring 74 ensures a fluid-tight engagement between the annular plate 66 and the spacing tube 48.

The outer locking subassembly 38 is applied to the free end of shaft 46 to compress the test plug 30 and to tighten the test plug 30 into engagement with the branch connection 12 and tank, vessel, or pipe section 10. To this end, seal 62 is forced into fluid-tight engagement with the inner surface 10a of tank, vessel, or pipe section 10 and a fluid-tight test chamber 40 is formed.

Thereafter, air or gas is removed from chamber 40 through vent port 44, while a fluid is pumped into chamber 40 to pressure test and leak test the weld connection, 14 or 16. Alternatively, a vacuum test can be performed, or an inert gas can be pumped through chamber 40 to enable an outer weld 16 to be safely applied.

When the branch connection 90 is without a flanged end, the entire test plug 94 is inserted through the inner end of the branch connection 90 within the tank, vessel, or pipe section 92. The inner subassembly 96 of the test plug 94 is brought into contact with the inner surface of section 92, and thereafter, the test plug 94 is compressed and tightened into engagement about the branch connection 90. To this end, the inner subassembly 96 forms a fluid-tight seal with the inner surface of section 92, and the grippers 108 are forced radially outward by the frustoconical member 106 to grip the inner diameter of the branch connection 90. In addition, the seal 10 is compressed so that it expands radially into sealing engagement with the inner diameter of the branch connection. Thereafter, pressure/leak testing and/or welding can be accomplished.

Thus, the above-described test plugs and methods can be utilized to test a connection, such as a welded connection, which interconnects a tank, vessel, or pipe to a branch pipe or nozzle. The test plugs and methods isolate the connection from the remainder of the tank, vessel or piping system to enable pressure/leak testing of the connection without requiring pressurization of the entire tank or vessel or a large section of the piping system. Further, the test plugs and methods can be utilized during welding operations to isolate harmful materials, vapors or fumes existing within tanks, vessels or piping systems from the weld location and to permit the flow of an inert gas to safely flush any potentially harmful vapors or the like away from the welding area.

While a preferred test plug and method have been described in detail, various modifications, alterations, and changes may be made without departing from the spirit and scope of the test plug and method according to the present invention as defined in the appended claims.

What is claimed is:

1. A test plug for isolating and testing the integrity of a connection between a wall of a vessel and a relatively smaller branch pipe extending transversely therefrom, the branch pipe having an inner end extending within the vessel and an open free end extending externally of the vessel, comprising:

an inner subassembly for extending a spaced distance from and enclosing the inner end of the branch pipe without engaging the branch pipe and for forming a fluid-tight seal only against an inner surface of the wall of the vessel at a location spaced from and surrounding the connection when the test plug is in an installed condition; and a second subassembly for forming a fluid-tight seal with the free end of the branch pipe when the test plug is in said installed condition;

in said installed condition, said inner and second subassemblies interconnecting to form a fluid-tight chamber that isolates the connection from a remainder of the vessel; so that said chamber isolates the connection from vapor and materials present within the vessel and permits integrity and leak tests of the connection.

2. A test plug according to claim 1, wherein said inner subassembly has an end surface which mates with the inner surface of the wall of the vessel surrounding the connection when the test plug is in said installed condition, and wherein said end surface of said inner subassembly is contoured to substantially correspond to a contour of the inner surface of the wall of the vessel.

3. A test plug according to claim 2, wherein at least one shaft extends between and interconnects said inner and second subassemblies and extends through the branch pipe when the test plug is in said installed condition.

4. A test plug according to claim 3, wherein said inner subassembly includes a reversely-turned sealing means which extends from the shaft.

5. A test plug for isolating and testing the integrity of a connection between a wall of a vessel and a relatively smaller branch pipe extending transversely therefrom, the branch pipe having an inner end extending within the vessel and an open free end extending externally of the vessel, comprising:
- an inner subassembly for enclosing the inner end of the branch pipe and for forming a fluid-tight seal with an inner surface of the wall of the vessel adjacent and surrounding the connection when the test plug is in an installed condition, said inner subassembly having an end surface with a contour that substantially corresponds to a contour of the inner surface of the wall of the vessel so that said end surface mates with the inner surface of the wall of the vessel surrounding the connection when the test plug is in said installed condition;
- a second subassembly for forming a fluid-tight seal with the free end of the branch pipe when the test plug is in said installed condition; and
- at least one shaft extending between and interconnecting said inner and second subassemblies and extending through the branch pipe when the test plug is in said installed condition;
- said inner subassembly including a reversely-turned sealing means that extends from the shaft, said reversely-turned sealing means includes an annular washer plate mounted on said shaft, a compression tube engaged by said washer plate, an annular compression plate engaged by said compression tube, and a resilient seal engaged by said compression plate; and
- in said installed condition, said inner and second subassemblies interconnecting to form a fluid-tight chamber that isolates the connection from a remainder of the vessel;

whereby said chamber is utilized to isolate the connection from vapor and materials present within the vessel and for performing integrity and leak tests of the connection.

6. A test plug according to claim 5, wherein said contour of the said end surface of said inner subassembly is non-planar.

7. A test plug according to claim 5, wherein said compression plate has a contour corresponding to the contour of the inner surface of the wall of the vessel surrounding the connection.

8. A test plug according to claim 7, wherein said reversely-turned sealing means includes a rigid ring which extends concentrically about said seal, whereby said ring prevents said seal from being blown out of sealing engagement during high test pressure conditions.

9. A test plug according to claim 5, wherein said second subassembly includes a flange plate and a cylindrical spacing tube about and parallel to said shaft for adjustably spacing said inner subassembly from said flange plate, said flange plate having a central opening which receives said spacing tube.

10. A test plug according to claim 5, wherein said second subassembly is an inner diameter plug subassembly for forming a fluid-tight seal with an inner diameter surface of the branch pipe.

11. A test plug according to claim 10, wherein said inner diameter plug subassembly includes proximal and distal compression plates slidably mounted on said shaft, and a frustoconical member, a plurality of grippers, and a resilient annular seal located between said proximal and distal compression plates.

12. A test plug for isolating and testing the integrity of a connection between a wall of a vessel and a relatively smaller branch pipe extending transversely therefrom, the branch pipe having an inner end extending within the vessel and an open free end extending externally of the vessel, comprising:
- an inner subassembly for enclosing the inner end of the branch pipe and for forming a fluid-tight seal with an inner surface of the wall of the vessel adjacent and surrounding the connection when the test plug is in an installed condition, said inner subassembly having an end surface with a contour that substantially corresponds to a contour of the inner surface of the wall of the vessel so that said end surface mates with the inner surface of the wall of the vessel surrounding the connection when the test plug is in said installed condition;
- a second subassembly for forming a fluid-tight seal with the free end of the branch pipe when the test plug is in said installed condition; and
- at least one shaft extending between and interconnecting said inner and second subassemblies and extending through the branch pipe when the test plug is in said installed condition;
- said second subassembly including a flange plate and a cylindrical spacing tube about and parallel to said shaft for adjustably spacing said inner subassembly from said flange plate, said flange plate having a central opening which receives said spacing tube, a resilient O-ring for forming a fluid-tight connection between said flange plate and said spacing tube, and a resilient gasket for forming a fluid-tight seal between said flange plate and an open flanged end of the branch pipe when the test plug is in said installed condition; and
- in said installed condition, said inner and second subassemblies interconnecting to form a fluid-tight chamber that isolates the connection from a remainder of the vessel;

whereby said chamber is utilized to isolate the connection from vapor and materials present within the vessel and for performing integrity and leak tests of the connection.

13. A test plug according to claim 12, wherein at least one of a fill port and a vent port extend through said flange plate and communicate with said chamber.

14. A test plug according to claim 12, wherein said second subassembly includes a locking subassembly for reducing the spacing between said flange plate and said inner subassembly and for locking the test plug in said installed condition.

15. A test plug for isolating and testing the integrity of a connection between a wall of a vessel and a relatively smaller branch pipe extending transversely therefrom, the branch pipe having an inner end extending within the vessel and an open free end extending externally of the vessel, comprising:
- an inner subassembly for enclosing the inner end of the branch pipe and for forming a fluid-tight seal with an inner surface of the wall of the vessel adjacent and surrounding the connection when the test plug is in an installed condition, said inner subassembly having an end surface with a contour that substantially corresponds to a contour of the inner surface of the wall of the vessel so that said end surface mates with the inner surface of the wall of the vessel surrounding the connection when the test plug is in said installed condition;

a second subassembly for forming a fluid-tight seal with the free end of the branch pipe when the test plug is in said installed condition; and at least one shaft extending between and interconnecting said inner and second subassemblies and extending through the branch pipe when the test plug is in said installed condition;

said second subassembly including a flange plate and a cylindrical spacing tube about and parallel to said shaft for adjustably spacing said inner subassembly from said flange plate, said flange plate having a central opening which receives said spacing tube;

said second subassembly including a locking subassembly for reducing the spacing between said flange plate and said inner subassembly and for locking the test plug in said installed condition, said locking subassembly including an annular washer plate mounted on said shaft and a compression tube engaged between said washer plate and flange plate; and in said installed condition, said inner and second subassemblies interconnecting to form a fluid-tight chamber that isolates the connection from a remainder of the vessel;

whereby said chamber is utilized to isolate the connection from vapor and materials present within the vessel and for performing integrity and leak tests of the connection.

16. In an assembly for testing the integrity of a connection between a wall of a vessel and a relatively smaller branch pipe extending transversely therefrom, wherein the branch pipe has an inner end extending within the vessel and an open free end extending externally of the vessel, and wherein a test plug is placed in an installed condition relative to said branch pipe, the improvement comprising a test plug having:

an inner subassembly for extending a spaced distance from and enclosing said inner end of said branch pipe without engaging the branch pipe and for forming a fluid-tight seal only against said inner surface of said wall of said vessel at a location spaced from and surrounding said connection; and a second subassembly for forming a fluid-tight seal with said open free end of said branch pipe;

said inner and second subassemblies interconnecting to form a fluid-tight chamber that isolates said connection from a remainder of said vessel so that said chamber isolates said connection from vapor and materials present within said vessel and permits integrity and leak tests on said connection.

17. A test plug according to claim 16, wherein said connection is a welded connection, said vessel is selected from the group consisting of a tank and a pipe, and said branch pipe is selected from the group consisting of a flanged branch connection, a non-flanged branch connection and a nozzle.

18. A method of isolating and proving the integrity of a connection between a wall of a vessel and a relatively smaller branch pipe extending transversely therefrom, comprising the steps of:

inserting at least a portion of a test plug through the branch pipe;

enclosing the connection and an inner end of the branch pipe that extends within the vessel within an inner subassembly of said test plug that extends around the inner end of the branch pipe and engages an inner surface of the wall of the vessel at a location spaced from and surrounding the connection;

forming a fluid-tight seal with said test plug adjacent an open free end of the branch pipe which extends externally of the vessel;

tightening said test plug such that said inner subassembly of said test plug forms a fluid-tight seal only with the inner surface of the wall of the vessel at said location spaced from and surrounding the connection to thereby form a fluid-tight chamber extending only within the branch pipe and around and closely spaced to the inner end of the branch pipe, said fluid-tight chamber isolating the connection from a remaining portion of the vessel; and pressurizing only the chamber and not the entire vessel to the test connection.

19. A method according to claim 18, wherein said test plug has a fill port in communication with said chamber, and further comprising the step of testing the integrity of the connection by filling said chamber via said fill port with a fluid to a predetermined pressure.

20. A method according to claim 19, wherein said test plug has a vent port in communication with said chamber and wherein said fluid is a liquid, and further comprising the step of venting the gases within the chamber while said chamber is being filled with a liquid.

21. A method according to claim 18, wherein said test plug has a fill port in communication with said chamber, and further comprising the step of testing the integrity of the connection by drawing a vacuum within said chamber via said fill port.

22. A method according to claim 18, further comprising the step of welding the connection between the vessel and branch pipe after said fluid-tight chamber is formed to isolate said welding from materials and vapor present within the vessel.

23. A method according to claim 22, further comprising the step of flushing said chamber with an inert gas before and during said welding.

24. A method according to claim 18, wherein said portion of said test plug inserted through the branch pipe during said inserting step is inserted through the inner end of the branch pipe accessed from within the vessel.

25. A method according to claim 18, wherein said fluid-tight seal formed at the open free end of the branch pipe located externally of the vessel is formed by the engagement of a flange plate of said test plug with a flanged end of the open free end of the branch pipe.

26. A method according to claim 18, wherein said fluid-tight seal formed at the open free end of the branch pipe located externally of the vessel is formed by the engagement of an inner diameter plug subassembly of said test plug with the inner diameter surface of the open free end of the branch pipe.

27. A method according to claim 18, wherein said inner subassembly has an end surface which mates with the inner surface of the wall of the vessel surrounding the connection, and further comprising the step of providing said test plug with an inner subassembly that has an end surface with a contour that substantially corresponds to a contour of the inner surface of the wall of the vessel.

28. A method according to claim 18, wherein said connection is a welded connection, said vessel is selected from the group consisting of a tank and a pipe, and said branch pipe is selected from the group consisting of a flanged branch connection, a non-flanged branch connection and a nozzle.

* * * * *